United States Patent Office 3,087,915
Patented Apr. 30, 1963

3,087,915
POLYMERS OF DIALLYL ESTERS
Charles H. Heiberger, Princeton, N.J., and James L. Thomas, Baltimore, Md., assignors to FMC Corporation, a corporation of Delaware
No Drawing. Filed Feb. 6, 1961, Ser. No. 87,127
4 Claims. (Cl. 260—78.5)

This invention relates to new polymer compositions derived from diallyl phthalate, and particularly to new thermoset resinous products having novel properties, and to the method of their production.

It is known that diallylic esters of dibasic acids, typically diallyl phthalate and related compounds, are readily polymerized in two stages: the first stage is a thermoplastic, fusible product of relatively low molecular weight, containing residual unsaturation and stable under ordinary conditions. This thermoplastic product, often called a "prepolymer," is readily further polymerized at elevated temperatures, usually in the presence of a peroxide catalyst, to form a thermoset, infusible resin.

This two-stage procedure is of particular value because most of the shrinkage which accompanies diallylic polymerizations occurs during the first stage; the second stage is then carried out in situ, accompanied by negligible shrinkage—thus maintaining the dimensional stability required particularly in such uses as the potting and encapsulating of electrical components. This negligible shrinkage during final cure is not negated by the addition of small amounts of monomer to enhance flow and facilitate completeness of cure during the second stage, and it is usual to combine minor amounts of monomeric diallyl phthalate with the prepolymer before final cure.

Diallyl phthalate resins, for their excellent physical and electrical properties, have been widely used in applications requiring high dielectric strength. However, there remain applications which place more rigorous demands on the electrical properties of the resin, while retaining strict requirements of dimensional stability, than can be met by the diallyl phthalate compositions heretofore available.

Accordingly, an object of the instant invention is to provide a resinous composition having improved electrical properties.

A further object is to provide a novel polydiallyl phthalate resin composition.

These and other objects, and attendant advantages, will become apparent from the following description of this invention.

We have now discovered that when diallyl phthalate prepolymers are mixed with minor amounts of monomeric dimethallyl maleate, then curing this combination with a peroxide catalyst at elevated temperatures, the product is a thermoset, infusible resin characterized by substantially improved electrical properties, evidenced in usually low power factors and loss factors, and low dielectric constants. These properties are far superior to those obtained when diallyl phthalate prepolymer is cured alone, or when the prepolymer is cured in combination with minor amounts of monomeric diallyl phthalate.

In accordance with this invention, diallyl phthalate is first polymerized to form a fusible thermoplastic polymer containing residual unsaturation. This polymerization may be carried out by standard techniques, such as are described in U.S. Patent 2,273,891. A preferred method for conducting this polymerization is described in copending application Ser. No. 814,957 of C. A. Heiberger. The general procedure is to subject the diallyl phthalate to elevated temperatures, with or without a peroxide catalyst, either undiluted or in the presence of a solvent. The polymerization reaction is continued until a portion of the monomer has been converted into thermoplastic polymer, and is discontinued before gelation of the reaction mix has occurred—normally at about 25–40% conversion of monomer to prepolymer.

The polymerization reaction may be carried out in a variety of nonaqueous media, or in the absence of any diluent. Lower aliphatic alcohols, having about 5 or less carbon atoms, and aromatic hydrocarbons such as benzene, toluene, xylene, ethylbenzene and isopropyl benzene, are effective media. The proportion of diluent may be adjusted to vary the reflux temperature, and to keep the reaction system homogeneous throughout the polymerization.

As the peroxide catalyst, a wide variety of organic peroxides have been used, including tert-butyl hydroperoxide, tert-butyl perbenzoate, dicumyl peroxide, benzoyl peroxide, and many others. Hydrogen peroxide is an especially effective catalyst for this polymerization.

The polymerization proceeds at temperatures ranging from about 85° to 200° C. or even higher. With peroxide catalysts, it is convenient to operate at temperatures between 105° and 120° C. under conditions of total reflux, using an organic solvent to adjust the reflux temperature. A wide range of pressures may be used, but for convenience, it is generally preferred to carry out the reaction at atmospheric pressure. The time required to complete the reaction will of course vary with these other conditions. The reaction is quenched before gelation occurs, by standard procedures such as lowering the temperature or drowning the reactants. The converted polymer is separated from unreacted monomer and residual solvent by known procedures, such as by stripping off volatile components, or dissolving unreacted monomer in an appropriate solvent. The number average molecular weight of the polymer formed by this process is normally less than 25,000, and generally below 10,000. The product is a solid, thermoplastic polymer containing residual unsaturation, and is readily polymerized further to form a cross-linked, thermoset resin. The preparation of the fusible prepolymer is illustrated in the following example:

*Example 1*

Following the preferred procedure of application Ser. 814,957, a prepolymer of diallyl phthalate was prepared as follows: 8860 pounds of monomer, 622 pounds of isopropanol (91% by volume) and 75 pounds of hydrogen peroxide (50.4% H₂O₂) were charged to a 1500 gallon stainless steel reactor, thoroughly agitated and heated to a pot temperature of 104–108° C. at total reflux. After 10 hours the viscosity of the reaction mixture had increased to 27 cps. at 106° C., as measured by a Bendix ultra-viscoson computator. The batch was cooled, to obtain a reaction product having a viscosity of 425 cps. at 25° C. This polymeric reaction product, which consists of approximately 27% polymer, 67% unreacted monomer and 6% isopropanol, was mixed intimately with 48,000 pounds of isopropanol (91% by volume), and the converted polymer precipitated at 0° C. The solid polymer was separated by filtration and dried, to yield a 27.6% conversion of monomer to polymer. Properties of the polymer obtained by this process are:

PPV, cps. at 25° C. _____ 354
Softening range _____ ° C__ 80–105
Iodine No. _____ 55
Sp. gr. at 25° C. (ASTM D792–50) _____ 1.267

The product is a thermoplastic solid possessing residual unsaturation. It is readily soluble in low molecular weight ketones, benzene, ethyl acetate and other solvents, and insoluble in alcohols, water and aliphatic hydrocarbons.

This fusible prepolymer is then blended with 10% to 40%, by weight of prepolymer, of dimethallyl maleate. Included in this blend may be other ingredients, for formulation as molding powders, laminating solutions, premixes, etc., depending on the ultimate use. A catalytic amount of a peroxide catalyst is also usually included, for more rapid cure at a lower temperature than if the final cure were thermally induced. Useful catalysts for this step include organic peroxides and hydroperoxides such as benzoyl peroxide and tertiary-butyl hydroperoxide, inorganic peroxides such as hydrogen peroxide and sodium peroxide, di(tertiaryalkyl)peroxides such as dicumyl peroxide, and mixtures thereof as well as many other catalysts which have been described in the literature. Such catalysts are used in the proportion of 0.01 to 10 percent depending on the efficiency of their action and whether or not substances which inhibit polymerization are present in the mixture to be cross-linked. Other additives, such as internal release agents, dyes, pigments and other agents used to impart particular properties, may be present.

The following examples illustrate the novel compositions of this invention. All parts are by weight. Mechanical and electrical properties are determined by standard ASTM methods.

*Example 2*

With 80 parts of the prepolymer prepared in Example 1 were blended 20 parts dimethallyl maleate and 3 parts tert.-butyl perbenzoate in a Hobart food mixer. The blend was compression molded, in bars 5″ x ¼″ x ½″ for 15 minutes at 150° C. and 8000 p.s.i., and postcured for 12 hours at 115° C. The product thus obtained had the following electrical and mechanical properties.

Diallyl phthalate prepolymer with: 20 percent dimethallyl maleate 60 cps.—
- Power factor (percent) _____ 1.01
- Dielectric constant _____ 3.52
- Loss factor _____ 3.57

1000 cps.—
- Power factor (percent) _____ 0.95
- Dielectric constant _____ 3.48
- Loss factor _____ 3.32

1 mega cps.—
- Power factor (percent) _____ 1.17
- Dielectric constant _____ 3.31
- Loss factor _____ 3.87

Heat distortion temp. at 264 p.s.i. (° C.) ____ 167
Izod impact, ft. lbs./in. notch _____ 0.24
Est. net impact, ft. lbs./in. notch _____ 0.08
Rockwell hardness (M) _____ 118

The products of this invention are particularly suited for use in the potting and encapsulating of electrical components. They may also be employed in molded articles, coating compositions, castings and other uses where an infusible thermoset product is desired.

Although the present invention has been described with reference to the specific details of certain embodiments thereof, it is not intended that such details shall be regarded as limitations upon the scope of the invention except insofar as included in the accompanying claims.

We claim:

1. A polymerizable mixture comprising a thermoplastic polymer of diallyl orthophthalate, which polymer contains residual unsaturation and is capable of further polymerization, and about 10% to 40% of dimethallyl maleate monomer, by weight of the total mixture of said polymer and monomer.

2. The thermoset resinous composition obtained by curing the polymerizable mixture of claim 1.

3. A polymerizable mixture comprising a thermoplastic polymer of diallyl phthalate, which polymer contains residual unsatuartion and is capable of further polymerization, about 10% to 40% of dimethallyl maleate monomer, by weight of the total mixture of said polymer and monomer, and a catalytic amount of an organic peroxide.

4. The thermoset resinous composition obtained by curing the polymerizable mixture of claim 3.

References Cited in the file of this patent

UNITED STATES PATENTS

| | | |
|---|---|---|
| 2,390,129 | Shobert | Dec. 4, 1945 |
| 2,595,852 | Hopper et al. | May 6, 1952 |
| 2,990,388 | Johnston et al. | June 27, 1961 |